(12) United States Patent
Bentley et al.

(10) Patent No.: US 10,749,320 B2
(45) Date of Patent: Aug. 18, 2020

(54) CRADLE FOR ELECTRICAL SWITCHGEAR

(71) Applicant: Schneider Electric Industries SAS, Rueil-Malmaison (FR)

(72) Inventors: Jon-Paul Bentley, Vaulnaveys-le-Haut (FR); Jean-Pierre Meley, Saint Ismier (FR); Philippe Pulfer, Claix (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 239 days.

(21) Appl. No.: 16/012,080

(22) Filed: Jun. 19, 2018

(65) Prior Publication Data
US 2019/0081463 A1    Mar. 14, 2019

(30) Foreign Application Priority Data

Sep. 12, 2017 (FR) ..................... 17 70952

(51) Int. Cl.
| | | |
|---|---|---|
| *H02B 11/00* | (2006.01) | |
| *H02B 11/02* | (2006.01) | |
| *H02B 11/24* | (2006.01) | |
| *H02B 11/133* | (2006.01) | |
| *H02B 3/00* | (2006.01) | |
| *G06F 1/16* | (2006.01) | |
| *H02B 11/167* | (2006.01) | |
| *H01H 9/22* | (2006.01) | |

(52) U.S. Cl.
CPC ............ *H02B 11/133* (2013.01); *G06F 1/16* (2013.01); *H01H 9/22* (2013.01); *H02B 3/00* (2013.01); *H02B 11/02* (2013.01); *H02B 11/167* (2013.01); *H02B 11/24* (2013.01)

(58) Field of Classification Search
CPC ........................................ H02B 11/00–11/28
See application file for complete search history.

(56) References Cited

FOREIGN PATENT DOCUMENTS

| CN | 202134840 U | 2/2012 |
| DE | 90 00 374 U1 | 5/1991 |
| WO | WO 2016/197507 A1 | 12/2016 |
| WO | WO 2017/024330 A1 | 2/2017 |

OTHER PUBLICATIONS

French Preliminary Search Report dated Feb. 22, 2018 in French Application 17 70952 filed on Sep. 12, 2017 (with English Translation of Categories of Cited Documents and Written Opinion).

*Primary Examiner* — Ramon M Barrera
(74) *Attorney, Agent, or Firm* — Oblon, McClelland, Maier & Neustadt, L.L.P.

(57) ABSTRACT

A cradle intended to be incorporated in a high-voltage electrical switchgear cubicle, including a mobile trolley bearing a switch apparatus provided with mobile contacts, a mechanism for operating the mobile contacts via operating springs and at least one coil for actuating the operating springs, a motorized protection shutter intended to prevent access to conductive busbars of the switchgear cubicle, and motorized device for driving the mobile trolley intended to be able to connect the switch apparatus to the conductive busbars. A first automation controller is embedded on the mobile trolley to control the operating mechanism and the actuating coil, and a second automation controller is embedded in the cradle to control the protection shutter and the device for driving the mobile trolley.

9 Claims, 1 Drawing Sheet

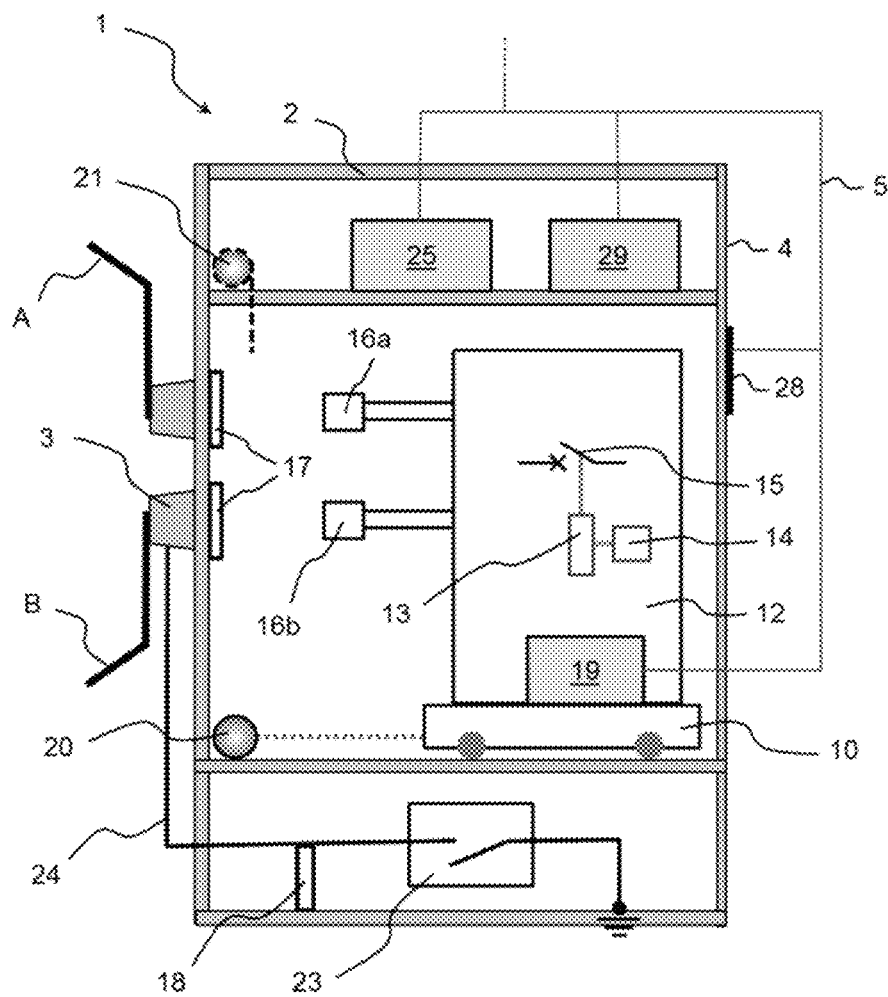

CRADLE FOR ELECTRICAL SWITCHGEAR

TECHNICAL FIELD OF THE INVENTION

The present invention relates to an assembly, also hereinafter in the document called "cradle", which is intended to be incorporated in a multiphase electrical switchgear cubicle. This assembly incorporates in particular a mobile trolley bearing an electrical switch apparatus.

The term "electrical switch apparatus" used groups together, without differentiation, any apparatus of switch, circuit breaker, contactor, disconnector, fuse switch or recloser type. The invention is particularly suited to the management and monitoring of high-voltage electrical networks, that is to say with a voltage higher than 1000 V.

STATE OF THE ART

A high-voltage electrical switchgear cubicle usually comprises a metal structure with several separate compartments. Therein, there may be a so-called "busbar" compartment placed for example at the rear of the cubicle and in which the conductive metal busbars of the electrical network are grouped together, a so-called "switchgear" compartment which comprises a switch apparatus which can be mounted on a mobile trolley so as to be unpluggable, that is to say disconnectable from the busbars, a so-called "cable" compartment for the cable connection part and which generally comprises the sensors for the current/voltage measurements, and a compartment customarily called "low voltage" box which comprises the protection and control system of the switch apparatus with, in particular, one or more protection and control relays. The document CN202134840U for example describes such a cubicle.

There are very many interactions between these various components of such a switchgear cubicle, which results in many electrical connections to be made for exchanges of information (commands, detections, measurements) and also many mechanical interlocks to be put in place for safety reasons. Moreover, numerous customizations and options must be able to be made according to the desired use and the needs sought by the customer using the cubicle, these options often having to be incorporated during the final assembly of the cubicle.

The result thereof is that the design, the formalization of the control, the assembly, the wiring, and the factory and on-site tests on such a high-voltage switchgear cubicle are complex operations which often require a high level of skill and know-how in high-voltage operations. Furthermore, the risks of error in these operations are significant.

Now, it is increasingly desirable to simplify, facilitate and ensure the reliability of these operations of design, assembly, wiring, testing and installation of a high-voltage switchgear cubicle. In particular, it is desirable to reduce the number of cables to be connected, replace a certain number of mechanical locks with electrical controls that are simpler to implement.

SUMMARY OF THE INVENTION

This aim is achieved by a cradle intended to be incorporated in a high-voltage electrical switchgear cubicle, the cradle comprising:
- a mobile trolley bearing a switch apparatus which is provided with mobile contacts, a mechanism for operating the mobile contacts via operating springs, and at least one coil for actuating the operating springs,
- a motorized protection shutter intended to prevent access to conductive busbars of the switchgear cubicle,
- motorized means for driving the mobile trolley intended to be able to connect the switch apparatus to the conductive busbars.

According to the invention, the operating mechanism and the actuating coil are controlled by a first automation controller embedded on the mobile trolley, and the means for driving the mobile trolley and the protection shutter are controlled by a second automation controller embedded in the cradle.

According to a feature, the cradle also comprises an earthing disconnector which is controlled by the second automation controller.

According to another feature, the cradle comprises an access door which is controlled by the second automation controller.

According to another feature, the first automation controller and the second automation controller are connected to one another by a digital link.

According to another feature, the cradle also comprises an electronic protection relay which is connected to the digital link.

According to another feature, the cradle comprises current sensors intended to measure currents circulating in the switch apparatus and linked to the electronic protection relay, and comprises voltage sensors intended to measure voltages in the switch apparatus and linked to the electronic protection relay.

According to another feature, the cradle also comprises a local human-machine interface connected to the digital link.

The invention relates also to a high-voltage switchgear cubicle, comprising upstream and downstream conductive busbars, the switchgear cubicle comprising such a cradle connected to the conductive busbars.

Advantageously, the cradle described in the invention is designed as an independent and homogeneous assembly managing a certain number of functions and it has all the control and monitoring means necessary to manage these functions. This principle makes it possible to obtain a modular and autonomous assembly for which the design, the formalization of the control, the assembly, the wiring, and the tests will be simpler, more reliable and faster to perform. That for example makes it possible:
- to offer a complete system comprising all the functions of the cradle before installation in the cubicle: the switch apparatus, the switchgear with the motorization thereof, the control and protection system, the sensors, the human-machine interfaces,
- to incorporate a central processing unit logically and digitally ensuring the control and interlocking functions,
- to offer a level of customization that is greater and simpler to implement through the parametrization of this central processing unit,
- to simplify the wiring by the introduction of digital links,
- to perform all the tests on the cradle just after the assembly thereof and therefore before the installation thereof in the cradle so as to speed up the final on-site commissioning, these tests being able to be automated according to programed sequences,
- to facilitate the maintenance by simplifying the access to the sensors and actuators linked to the cradle,
- to offer new functionalities such as the earthing of the conductive busbars via the switch apparatus and an earthing disconnector, or such as the automatic disarming of the operating springs prior to the extraction of the switch apparatus, to allow the local or remote control of the cubicle, by acting on the switch apparatus individually or by implementing automatic sequences of operations of multiple switch apparatuses.

Other features will emerge from the following detailed description given in light of the attached drawings in which:

FIG. 1 is a simplified diagram of a cradle according to an embodiment of the invention.

DETAILED DESCRIPTION

FIG. 1 presents the general structure the main components of a cradle 1 according to the invention. Such a cradle forms an autonomous assembly around a switch apparatus and advantageously groups together the various control, command and monitoring functions linked to this switch apparatus to facilitate the integration thereof in an electrical switchgear cubicle.

The cradle 1 comprises a structure or frame 2 which is preferably metallic. This metallic structure comprises in particular guiding rails on which a mobile trolley (also called truck) 10 can move. The mobile trolley 10 of the cradle 1 bears a switch apparatus 12 which, in the context of the example of FIG. 1, is a multipole circuit breaker, but the invention can also be applied to other switch apparatuses cited at the start of the present document.

For the various poles, this switch apparatus 12 has, as is known, fixed contacts cooperating with mobile contacts 15. The switch apparatus 12 comprises a spring operating mechanism 13 having operating springs, namely an opening spring and a closing spring, and comprises at least one coil 14 for actuating the operating springs. The actuation, by the coil 14, of the opening spring, respectively of the closing spring, makes it possible to actuate the opening, respectively the closing, of the mobile contacts 15 relative to the fixed contacts. For reasons of simplification, only one mobile contact 15 of a pole is represented in FIG. 1.

The switch apparatus can equally comprise an actuating coil for opening the mobile contacts and another actuating coil for closing the mobile contacts, or else can comprise a single actuating coil capable of controlling a movement in a direction to actuate the closing of the mobile contacts and a movement in the reverse direction to actuate the opening of the mobile contacts.

Conventionally, the operating mechanism 13 also comprises a rearming motor intended to rearm the operating springs, such that the switch apparatus 12 always has enough energy to be capable of performing, in the case of a fault on the electrical network, a rapid sequence of opening of the mobile contacts 15, then of closing-opening if necessary (O-F-O cycle).

Moreover, the switch apparatus 12 is provided with high-voltage connection contacts, respectively upstream 16a and downstream 16b, allowing it to be connected to a set of conductive busbars respectively upstream A and downstream B of the switchgear cubicle. This connection is made for example inside plug-in shells 3 of the cradle 1 for issues of dielectric insulation between the poles.

The cradle 1 comprises a switchgear compartment in which the trolley 10 and the switch apparatus 12 are located. This switchgear compartment also houses motorized means 20 for driving the mobile trolley 10 which are intended to move the mobile trolley 10 between a plugged-in position, in which the contacts 16a, 16b are respectively connected to the upstream A and downstream B busbars of the switchgear cubicle, and an unplugged position, in which the contacts 16a, 16b are disconnected from the busbars A, B. The driving means 20 comprise a driving motor which for example rotates a worm screw linked mechanically to the trolley 10. The driving means 20 also comprise the following elements, not represented in FIG. 1: attachment means making it possible to drive the switch apparatus 12 from the unplugged position to the plugged-in position, for example using an attachment finger cooperating with a lock mechanism device, and means allowing an automatic connection between the cradle 1 and the switch apparatus 12 to have the low-voltage signals circulate between the cradle 1 and the switch apparatus 12.

Optionally, the switchgear compartment of the cradle 1 also houses current sensors 17, preferably low level of LPCT (Low Power Current Tranformer) type, placed facing the plug-in shells 3 and passing through the connection contacts 16a and 16b, to measure the current circulating upstream and downstream of the switch apparatus 12 when the latter is in the plugged-in position. Similarly, voltage sensors 18, preferably low level of LPVT (Low Power Voltage Tranformer) type, can also be installed in the cradle 1, for example to measure a voltage between the switch apparatus 12 and the earth.

The cradle 1 also comprises a protection shutter 21 which is motorized. This shutter is folded back into a so-called high position to allow the connection contacts 16a, 16b of the switch apparatus 12 to have access to the high-voltage conductive busbars A, B of the switchgear cubicle, or unfolded in a so-called low position to prohibit access to the conductive busbars A, B when the switch apparatus is unplugged, so as to ensure the safety of an operator by insulating him or her from the busbars A, B which are potentially at high voltage. The shutter 12 can be guided in its movement by guiding rails linked to the metallic structure 2 of the cradle 1.

Optionally, the cradle 1 also has an earthing function, which is usually housed in the bottom part of the cradle 1. This function is produced using an earthing disconnector 23, which is connected on one side to a point of the metallic structure 2 linked to the earth, and on the other side to the downstream conductive busbar B via a conductor 24.

According to the invention, the cradle 1 comprises a first automation controller 19 and a second automation controller 29. The first automation controller 19 and the second automation controller 29 can be programmable logic controllers of PLC (Programmable Logic Controller) type or, more generally, any type of IED (Intelligent Electronic Device) having a memory, inputs/outputs and a central processing unit capable of reading the inputs linked with, for example, sensors, of executing a program stored in the memory so as to write the outputs linked for example with actuators. They are connected to the various sensors/actuators by wired or wireless links.

Furthermore, they are connected to one another by a digital link 5, based for example on a communication network of Ethernet and/or wireless type, allowing them to exchange data/information in real time. Preferentially, this digital link 5 also makes it possible to have the automation controllers 19, 29 communicate with a remote control and supervision system, of SCADA (Supervisory Control And Data Acquisition) type, or similar. Furthermore, for dialoguing with a local operator, the cradle 1 can comprise a local human-machine interface 28, for example of screen/keyboard type placed on the front panel 4 of the cradle 1 or remotely (smartphone, tablet), this human-machine interface 28 itself also being connected to the digital link 5.

The first automation controller 19 is embedded directly on the mobile trolley 10 and is more particularly responsible for monitoring and controlling the elements which are linked to the switch apparatus 12, in particular the operating mechanism 13 and the actuating coil or coils 14. The first automation controller 19 also manages the control of any auxiliary relays linked to the switch apparatus based on information on the position of the mobile contacts 15 or auxiliary sensors.

For that, the first automation controller 19 can receive as input information from the various sensors which are also incorporated in the cradle 1, such as the currents circulating in the actuating coil and in the operating spring rearming motor, the position of the operating springs, the position of the mobile contacts 15, information on the status of the switch apparatus 12 (loss of vacuum, temperature, contact welding), the position of the mobile trolley, etc.

The second automation controller 29 is more particularly responsible for monitoring and controlling the other elements linked to the cradle 1, in particular the motor of the protection shutter 21 and the motor of the means 20 for driving the mobile trolley. The second automation controller 29 also monitors and controls the earthing disconnector 23. It also manages the local human-machine interface 28 when such exists, as well as the controls for locking access to the interior of the cradle, such as, for example, the control of an access door of the cradle 1 allowing access to the switch apparatus 12. This access door (not represented in FIG. 1) is situated on the front panel 4 of the cradle 1 and is controlled by an electrical lock driven by the second automation controller 29.

For that, the second automation controller 29 can receive as input information from various sensors which are also incorporated in the cradle 1, such as the currents circulating in the motor of the shutter 21 and in the driving motor 20, the position of the mobile trolley 10, the position of the shutter 21, the position of the contacts of the disconnector 23, information on the safety locks (access to compartments and front panel of the cradle) and on the environment of the cradle (temperature, humidity, etc.), the position (open or closed) of the access door on the front panel of the cradle 1, etc.

Furthermore, an electronic protection relay 25, distinct from the second automation controller 29, is embedded in the cradle 1. It is connected to the first automation controller 19 and to the second automation controller 29 by the digital link 5 in order to be able to exchange data/information. The electronic protection relay 25, which can also be of IED or PLC type, is mainly responsible for monitoring the status of the electrical network circulating in the switch apparatus 12 to protect the load connected to the switchgear cubicle and to send commands to open and close the mobile contacts 15 of the switch apparatus 12. Even though these functions could be incorporated in the first or the second automation controller, it is generally preferred, for safety and availability reasons, to dissociate them in a specific device 25 responsible for monitoring faults and anomalies on the electrical network.

The electronic protection relay 25 receives as input information from, in particular, low-level current sensors LPCT 17, low-level voltage sensors LPVT 18, and the position of the mobile contacts of the switch apparatus 12 (open, closed). This information can then be transmitted to the second automation controller 29 via the digital link 5.

Thus, the digital architecture of the cradle 1 forms an integrated and autonomous assembly which makes it possible to electrically and digitally manage all of the controls with their associated electrical interlocks, whereas, previously, these interlocks often comprised mechanical components more complicated to implement and more restricted in terms of functionalities.

In particular, the mechanical interlock between the authorization to close the earthing disconnector 23 and the unplugged position of the switch apparatus 12 no longer exists. It is the second automation controller 29, responsible for controlling the disconnector 23, which monitors the required conditions that make it possible to authorize the opening/closing of the disconnector 23. That makes it possible to easily produce the functionality which consists in being able to connect the upstream A and downstream B conductive busbars to the earth, by advantageously avoiding the addition of a specific cubicle or the use of an earthing shunt. For that, the second automation controller 29 checks that the switch apparatus 12 is in the plugged-in position and in the on state (that is to say mobile contacts closed 15), then checks the absence of voltage circulating in the switch apparatus 12 (by virtue of the sensors 18). It can then, at the request of an operator, close the disconnector 23 in total safety, which provides a simple means of connecting the conductive busbars A and B to the earth, which is useful for carrying out maintenance on the busbars.

Similarly, when an operator wants to extract the switch apparatus 12 and take it out of the cradle 1 the first automation controller 19 is capable of easily performing a functionality which consists in automatically relieving the operating springs to avoid any risk associated with the presence of an armed spring in proximity to the operator. This functionality is now carried out electrically and no longer requires any complex mechanical device. For that, when the switch apparatus 12 is in the unplugged position and before authorizing the opening of the access door of the cradle 1, the first automation controller 19 automatically performs an operation of closing then opening the mobile contacts 15 of the switch apparatus 12 without then reactivating the rearming motor of the operating mechanism 13. Thus, without requiring any mechanical device, the operating springs are not armed when the operator extracts the switch apparatus 12, which will reduce the risks in the work of the operator.

The invention claimed is:

1. A cradle to be incorporated in a high-voltage electrical switchgear cubicle, the cradle comprising:
    a mobile trolley bearing a switch apparatus which is provided with mobile contacts, a mechanism for operating the mobile contacts via operating springs, and at least one coil for actuating the operating springs,
    a motorized protection shutter configured to prevent access to conductive busbars of the switchgear cubicle,
    motorized means for driving the mobile trolley configured to be able to connect the switch apparatus to the conductive busbars, wherein:
    the operating mechanism and the actuating coil are controlled by a first automation controller embedded on the mobile trolley,
    the motorized means for driving the mobile trolley and the protection shutter are controlled by a second automation controller embedded in the cradle.

2. The cradle according to claim 1, comprising an earthing disconnector which is controlled by the second automation controller.

3. The cradle according to claim 1, comprising an access door which is controlled by the second automation controller.

4. The cradle according to claim 1, wherein the first automation controller and the second automation controller are connected to one another by a digital link.

5. The cradle according to claim 4, wherein an electronic protection relay is also embedded in the cradle, the electronic protection relay being connected to the digital link.

6. The cradle according to claim 5, further comprising current sensors configured to measure currents circulating in the switch apparatus and linked to the electronic protection relay.

7. The cradle according to claim 5, comprising voltage sensors configured to measure voltages in the switch apparatus and linked to the electronic protection relay.

8. The cradle according to claim 4, further comprising a local human-machine interface connected to the digital link.

9. A high-voltage switchgear cubicle, comprising upstream and downstream conductive busbars, and a cradle according to claim 1, said cradle being connected to the conductive busbars.

* * * * *